United States Patent [19]

Huang

[11] Patent Number: 5,453,001

[45] Date of Patent: Sep. 26, 1995

[54] MOLDING TOOL WITH BLOWING DEVICE

[76] Inventor: Kuo-Wen Huang, P.O. Box 1750, Taichung, Taiwan

[21] Appl. No.: 273,988

[22] Filed: Jul. 12, 1994

[51] Int. Cl.⁶ .................................................. B29C 49/58
[52] U.S. Cl. .............................................. 425/535; 425/536
[58] Field of Search .................................. 425/535, 536, 425/532, 533; 264/524, 525, 539, 540

[56] References Cited

U.S. PATENT DOCUMENTS

| 4,277,232 | 7/1981 | Taluba et al. | 425/535 X |
| 4,699,585 | 10/1987 | Giese et al. | 425/535 X |
| 4,954,071 | 9/1990 | Austin | 425/535 X |
| 5,041,247 | 8/1991 | Kim | 425/535 X |
| 5,085,822 | 2/1992 | Uehara et al. | 425/535 X |
| 5,364,252 | 11/1994 | Hlavaty et al. | 425/536 X |

FOREIGN PATENT DOCUMENTS 2306766  11/1976  France ...................... 425/535

Primary Examiner—Richard L. Chiesa

[57] ABSTRACT

A molding tool has a mold cavity provided with a recess with a blowing needle guiding seat. Located in the blowing needle guiding seat is a tapered hole in which the blowing needle is movably received to carry out the blowing process. The blowing needle is caused to descend so as to seal off the blow hole before the hollow object takes shape in the mold cavity. The hollow object so formed is therefore devoid of a blow hole.

3 Claims, 8 Drawing Sheets

MOLDING TOOL WITH BLOWING DEVICE

FIELD OF THE INVENTION

The present invention relates generally to a molding tool, and more particularly to a molding tool having a blowing device.

BACKGROUND OF THE INVENTION

The conventional method of making a hollow plastic toy involves a process in which a cylindrical body is made of a thermoplastic plastic material by extrusion molding. The cylindrical body so made is then transferred immediately to the mold cavity of a molding tool into which air is blown via a blowing needle, which is withdrawn as soon as the cylindrical body of the thermoplastic plastic material is caused to take shape in the mold cavity.

Such a conventional method of making a hollow object as described above is defective in design in that the object so formed is generally composed of a blow hole which causes the object to recover its original shape rather slowly after being forced out of shape. In addition, the blow hole can also cause the object to lose its elasticity.

SUMMARY OF THE INVENTION

It is therefore the primary objective of the present invention to provide a molding tool with a blowing device capable of averting the formation of a blow hole in an object formed in the molding tool.

The foregoing objective of the present invention is attained by a molding tool having a mold cavity provided with a recess which has a blowing needle guiding seat. Located in the blowing needle guiding seat is a tapered hole in which the blowing needle is received movably to carry out the blowing process. The blowing needle is caused to descend so as to seal off the blow hole before the hollow object takes shape in the mold cavity. The hollow object so formed is devoid of a blow hole.

The foregoing objective, features and functions of the present invention will be more readily understood upon a thoughtful deliberation of the following detailed description of the embodiment of the present invention in conjunction with the accompanying drawings.

DETAILED DESCRIPTION OF THE PREFERRED EMBODIMENTS

Figure 1:
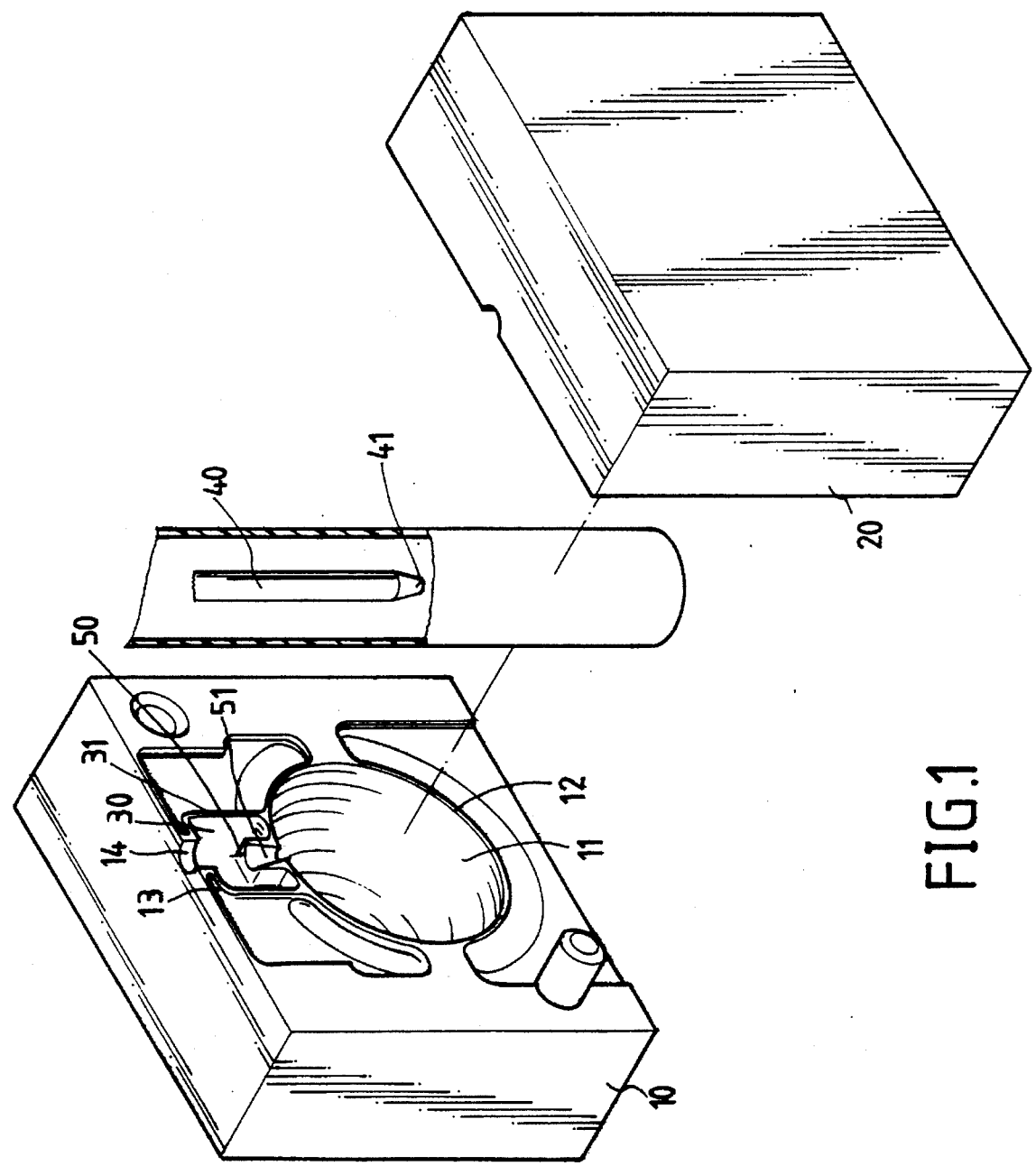
FIG. 1 is a schematic view showing two separated molds of a molding tool of the present invention.
Figure 2:
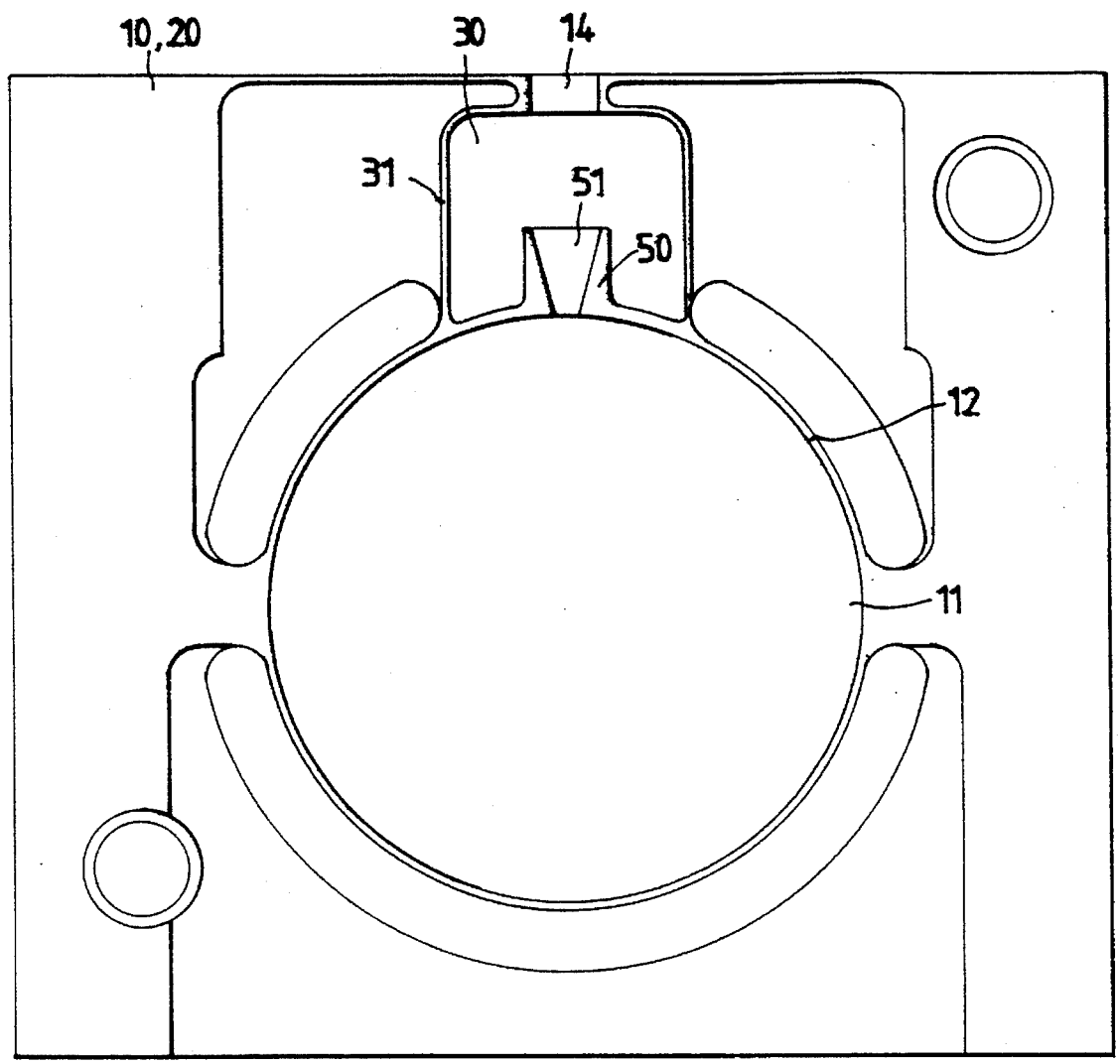
FIG. 2 shows a front elevational view of the molding tool of the present invention.

As shown in FIGS. 1 and 2, a molding tool embodied in the present invention is composed of a left mold 10 and a right mold 20 for making a plastic toy ball. The left mold 10 and the right mold 20 are corresponding in construction to each other; they are put together to form the molding tool of the present invention. The left mold 10 and the right mold 20 are provided respectively with a spherical mold cavity 11 having a raised fringe 12 and are further provided respectively with a recess 30 of a predetermined dimension and in communication with the mold cavity 11. The recess 30 has a raised edge 31 which is connected with the raised fringe 12 of the mold cavity 11.

The recess 30 is provided centrally therein with a hole guiding seat 50 of a predetermined height and having a tapered hole 51 in communication with the mold cavity 11. The tapered hole 51 is capable of accommodating a blowing needle 40 which is inserted into an insertion hole 14 having a length shorter than that of the recess 30.

Figure 3:
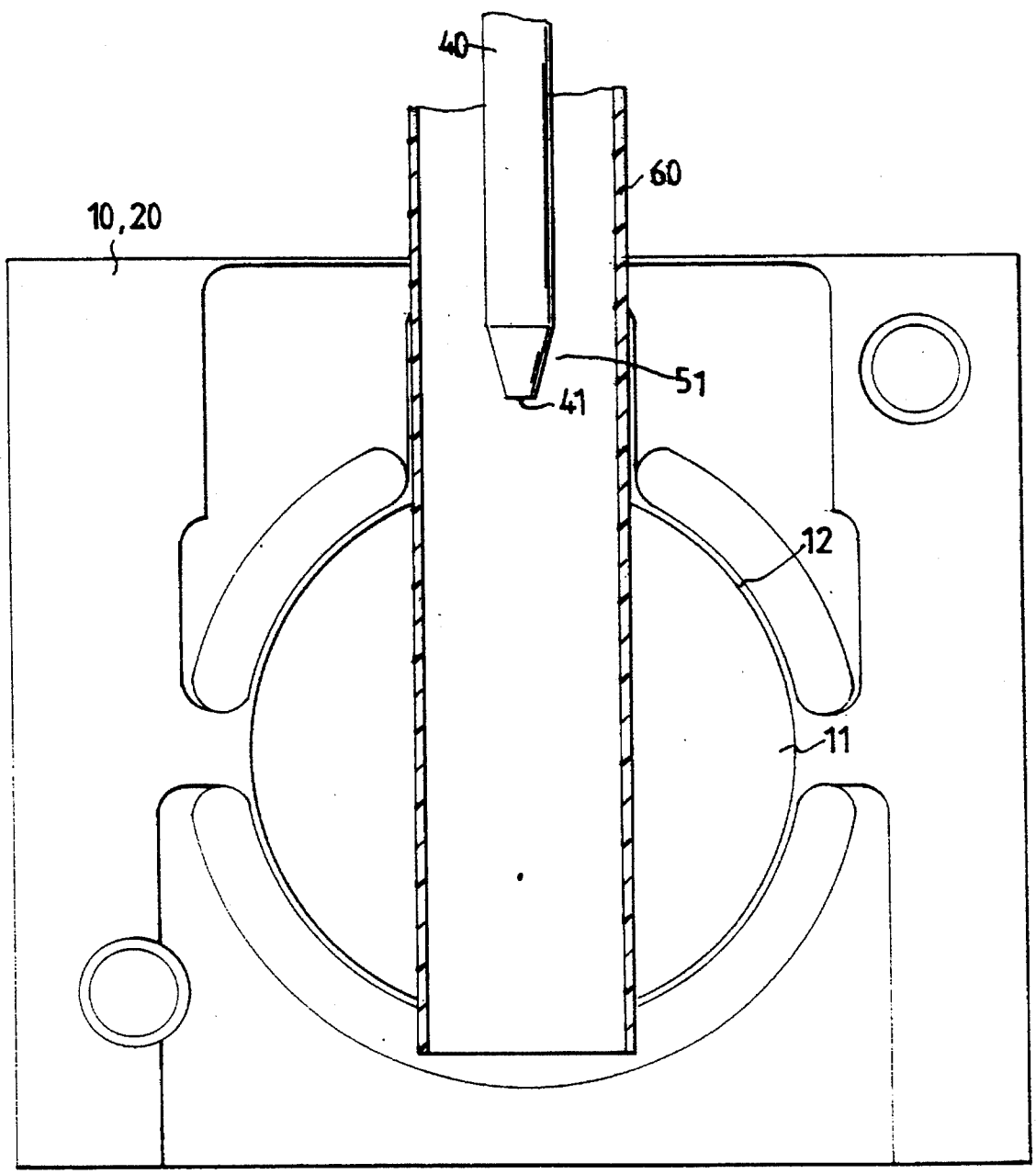
FIG. 3 is a schematic view showing that a blowing needle and a cylindrical blank material are so positioned in the molding tool of the present invention that they are ready for the blowing process to be carried out.
Figure 4:
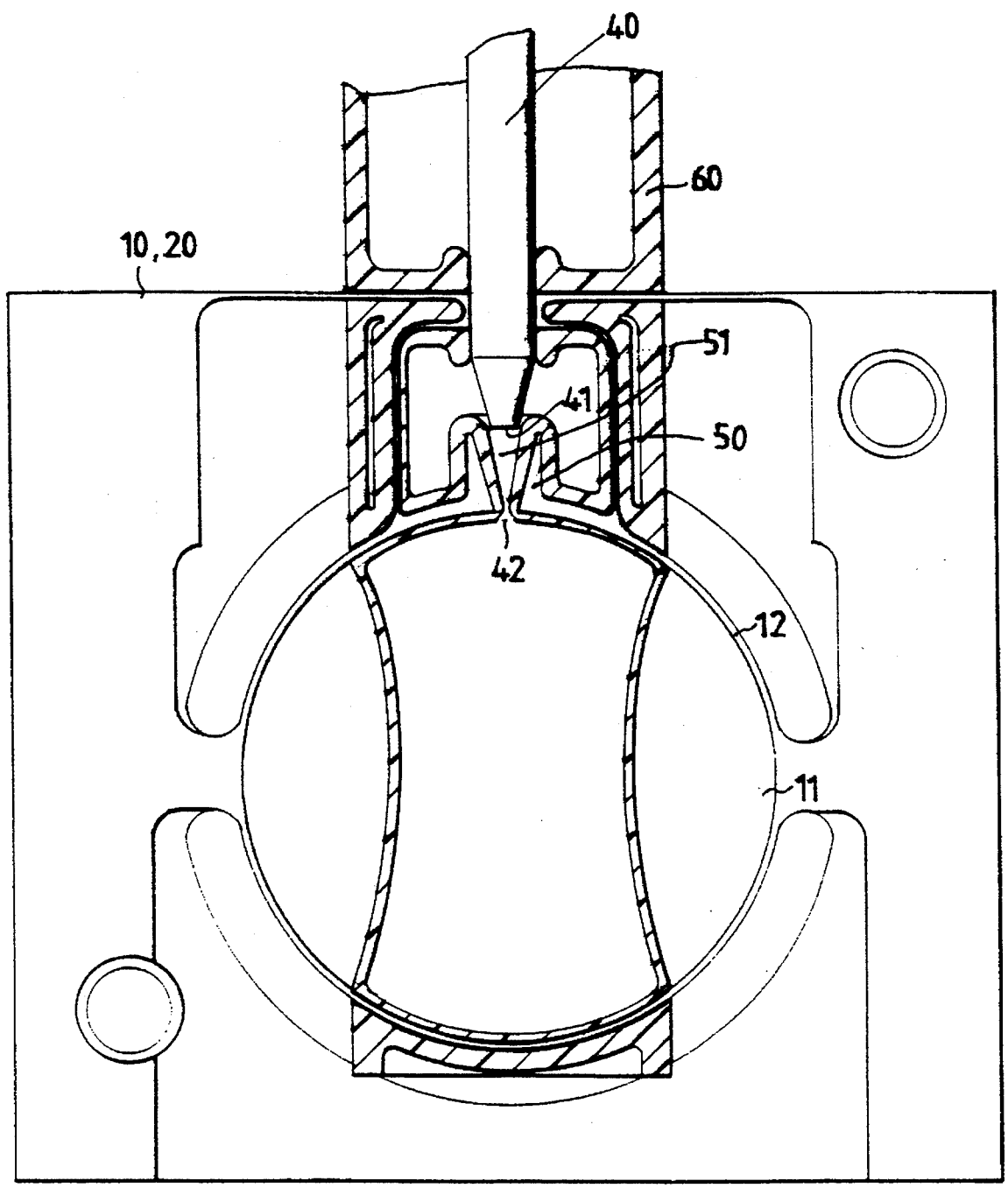
FIG. 4 is a schematic view showing that the molding tool of the present invention is closed and that the cylindrical blank material is located in the mold cavity of the molding tool of the present invention.

The operation of the molding tool of the present invention is illustrated in FIG. 3. Upon being formed by extrusion molding, a cylindrical blank 60 of a plastic material is introduced into the mold cavity 11. The molding tool is then closed before the blowing needle 40 is descended such that the bottom end 41 of the blowing needle 40 is located in the upper end of the tapered hole 51 of the hole guiding seat 50, as shown in FIG. 4.

Figure 5:
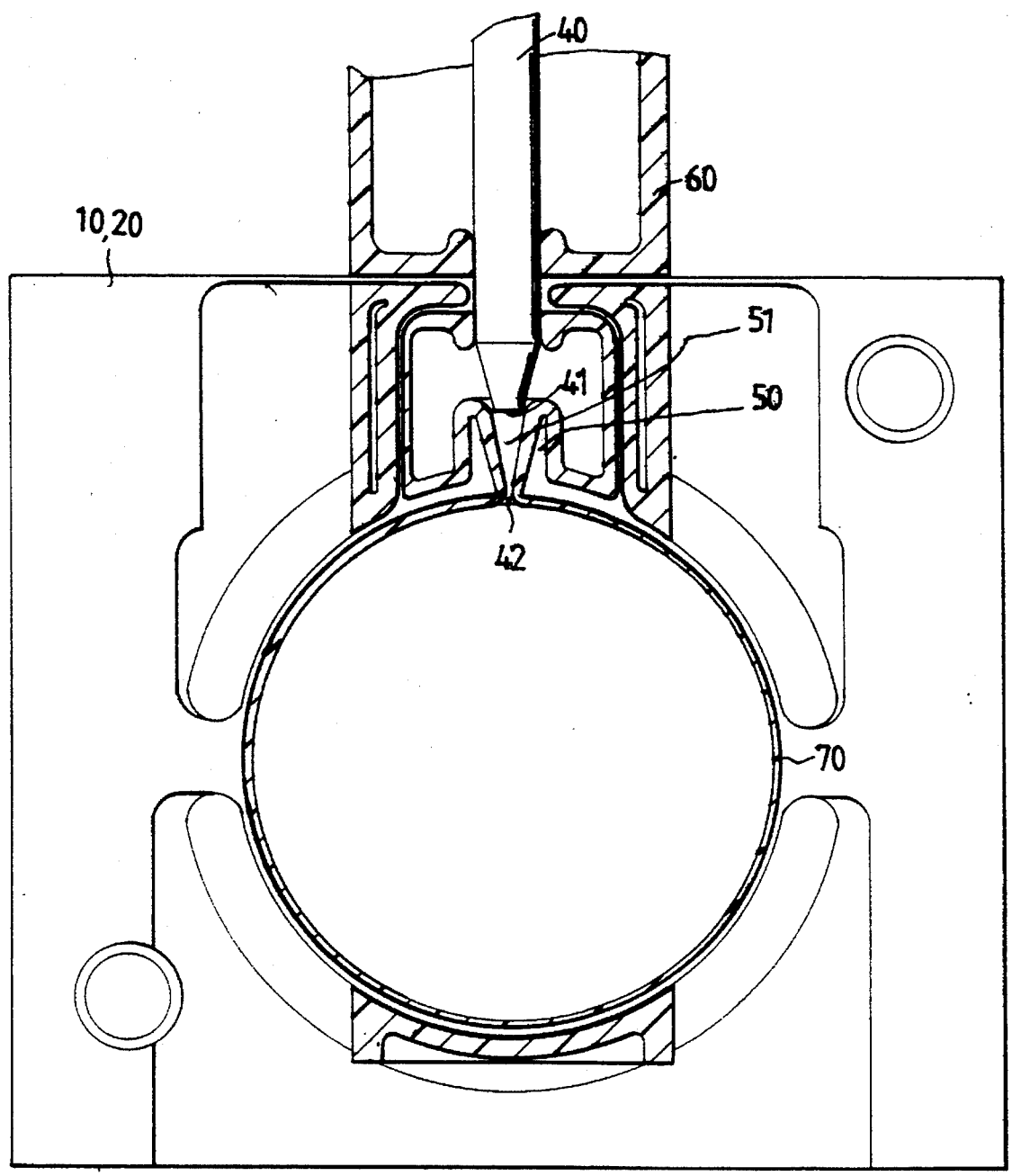
FIG. 5 is a schematic view showing that the blowing process is under way and that the cylindrical blank material is caused to attach to the inner wall surface of the mold cavity of the molding tool of the present invention.
Figure 6:
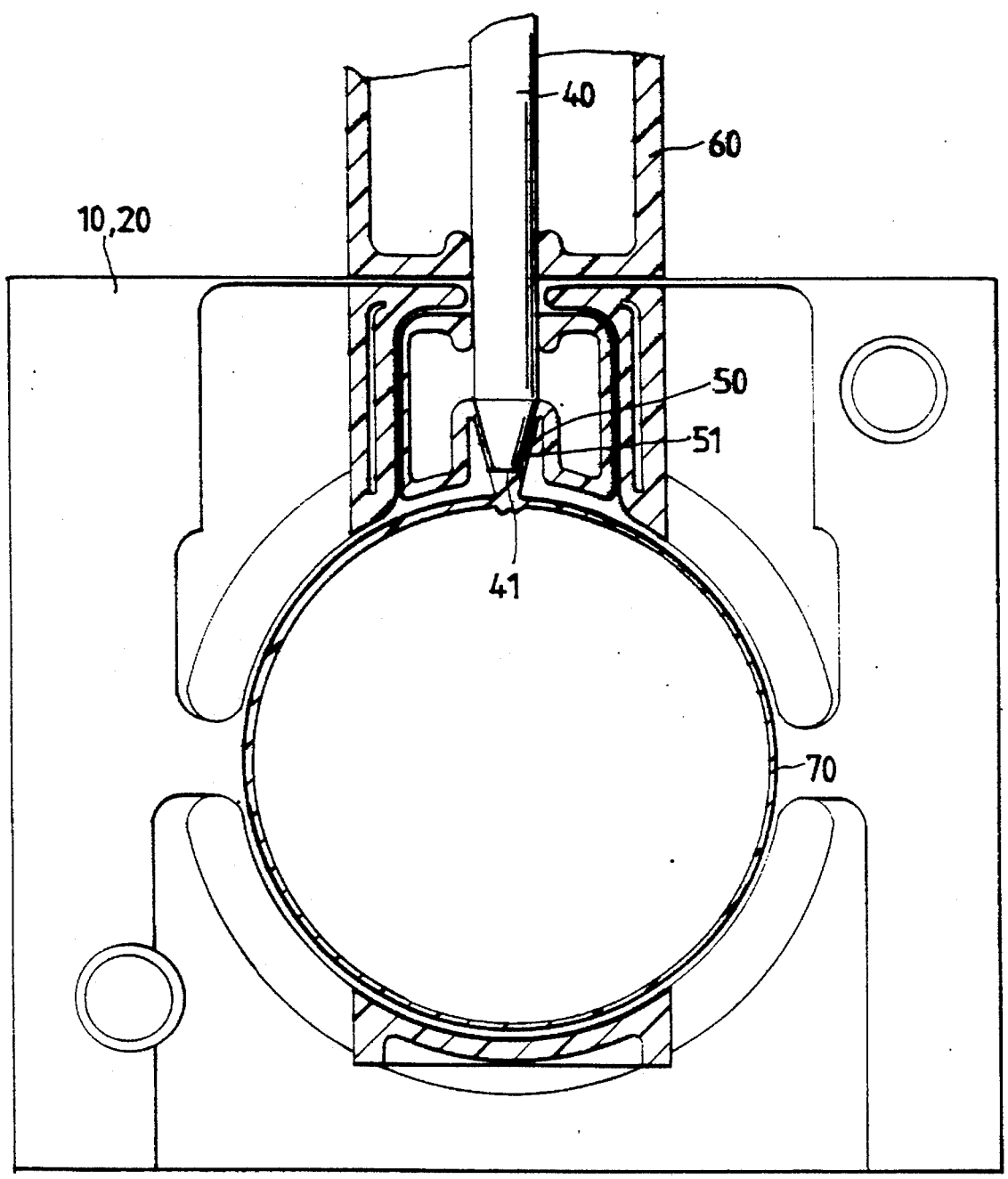
FIG. 6 is a schematic view showing that the blowing needle of the present invention is descended further to seal off the blow hole.
Figure 7:
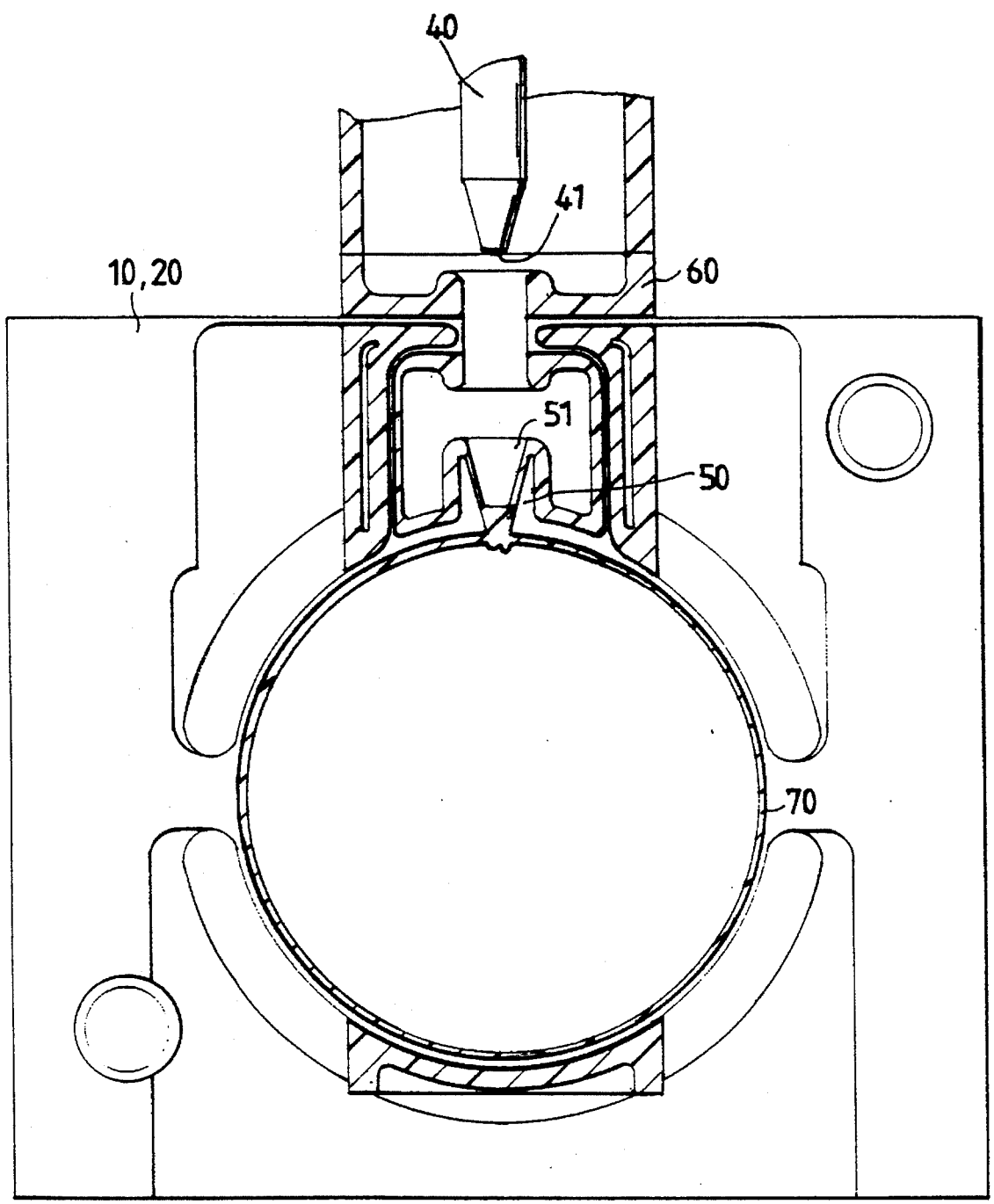
FIG. 7 is a schematic view showing that the blowing needle of the present invention is withdrawn from the blow tube.
Figure 8:
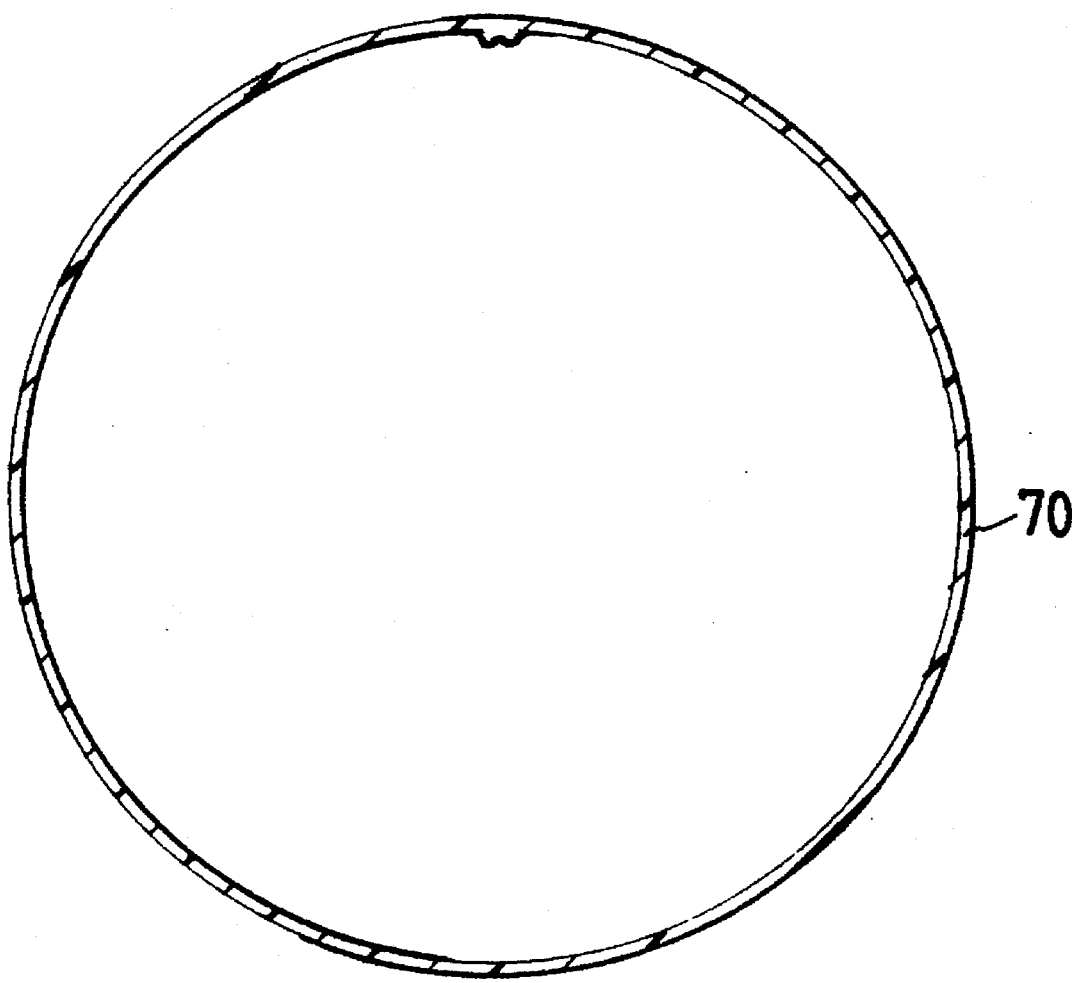
FIG. 8 shows a schematic view of a toy ball formed in the molding tool of the present invention.

As illustrated in FIG. 5, air is blown into the blank 60 via the blowing needle 40 so as to cause the blank 60 to attach to the inner wall surface of the mold cavity 11. In other words, the blank 60 is caused to form a spherical body with a blow hole 42. As the spherical body is formed in the mold cavity 11 of a spherical construction, the blowing needle 40 is descended further so as to cause the bottom end 41 of the blowing needle 40 to force the residue of the blank 60 in the tapered hole 51 of the hole guiding seat 50 to seal off the blow hole 42, as shown in FIG. 6. Thereafter, the blowing needle 40 is elevated to withdraw from the tapered hole 51, as shown in FIG. 7. Upon completion of the cooling process, the molding tool is opened to remove therefrom a toy ball 70, as shown in FIG. 8. The toy ball 70 so formed in the molding tool of the present invention is devoid of the blow hole and is therefore superior in quality to a toy ball made by the prior art molding tool. In other words, the toy ball 70 of the present invention is relatively more durable and can bounce better.

The embodiment of the present invention described above is to be regarded in all respects as merely illustrative and not restrictive. Accordingly, the present invention may be embodied in other specific forms without deviating from the spirit thereof. The present invention is therefore to be limited only by the scope of the following appended claims.

What is claimed is:

1. A molding tool with a blowing device comprising:

a left mold provided therein with a mold cavity having a raised fringe; and a right mold provided therein with a mold cavity, said right mold being corresponding in construction to said left mold;

wherein said mold cavity of said left mold and said mold cavity of said right mold are provided respectively with a recess of a predetermined dimension and having a guiding seat of a predetermined height and having a tapered hole communicating with said mold cavity and with an insertion hole of said mold cavity, said tapered hole being dimensioned to receive therein a bottom end of a blowing needle received in said insertion hole such that said bottom end of said blowing needle can be descended or elevated in said tapered hole.

2. The molding tool according to claim 1 wherein said mold cavity of said left mold and said mold cavity of said right mold are provided respectively with a raised fringe; and wherein said recess is provided with a raised edge which is connected with said raised fringe of said mold cavity.

3. The molding tool according to claim 1 wherein said insertion hole has a length shorter than that of said recess.

* * * * *